United States Patent Office 3,739,017
Patented June 12, 1973

3,739,017
OXIDATION OF ETHYLENE ACETALS OF
AROMATIC ALDEHYDES
Edward L. Reilly, Woodbury, N.J., assignor to E. I. du
Pont de Nemours and Company, Wilmington, Del.
No Drawing. Filed May 6, 1971, Ser. No. 141,012
Int. Cl. C07c 69/82
U.S. Cl. 260—475 P          7 Claims

ABSTRACT OF THE DISCLOSURE

An ethylene acetal of an aromatic aldehyde dissolved in a substantially inert, nonacidic organic solvent with a cobalt catalyst also dissolved therein is oxidized at a temperature of approximately 20–125° C. by molecular oxygen to form a 2-hydroxyethyl ester of the aromatic acid corresponding to the aldehyde.

BACKGROUND OF THE INVENTION

This invention relates to a process for oxidizing ethylenic acetals of aromatic aldehydes, and more particularly to the preparation of hydroxyethyl esters of the acids corresponding to the aldehydes.

Terephthalic acid and the corresponding methyl ester, dimethyl terephthalate, are commercially significant intermediates to polyethylene terephthalate, and other intermediates are continually being investigated for potential conversion to that polymer. Two such intermediates are mono and bis(2-hydroxyethyl)terephthalates, which offer substantial process advantages over the use of dimethyl terephthalate. The process of this invention provides a new method for manufacture of these specific intermediates. The invention further provides a process for the preparation of β-hydroxyethyl esters of carboxylic acids of the benzenes series without first making the corresponding acids.

A number of processes for the oxidation of acetals by molecular oxygen are available. However, these processes typically produce not an ester but the acid corresponding to the aldehyde. Other processes may produce esters but only by use of complex catalyst systems, intermediate products such as peroxides which must be further processed, or special techniques such as ultraviolet radiation. Until the present invention there has been no simple process for obtaining a desired hydroxyethyl ester directly by oxidizing the appropriate aryl ethylene acetal. In particular, there has not been available a process for the preparation of mono or bis(hydroxyethyl)terephthalate by oxidation of ethylene acetals of the corresponding aldehydes.

SUMMARY OF THE INVENTION

There is provided a process for the direct preparation of mono and/or bis(2-hydroxyethyl)esters of the acids corresponding to mono and/or dialdehydes of the benzene series by dissolving the ethylene acetal of the aldehyde in an inert nonacidic organic solvent containing a catalytic amount of a cobalt salt also dissolved therein and oxidizing the dissolved acetal with molecular oxygen at elevated temperature, i.e. in the range of about 20 to about 125° C. and preferably at elevated pressure, i.e., in the range 1–100 atmospheres, and thereafter recovering the ester. Typical chemical reactions are written as follows:

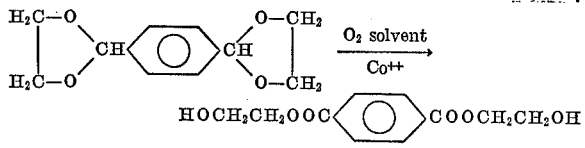

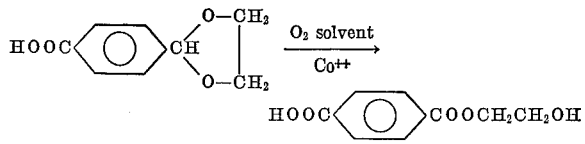

DETAILED DESCRIPTION OF THE INVENTION

Starting materials for the present process are ethylene acetals of aromatic mono and dialdehydes of the benzene series, including ethylene acetals of benzaldehyde; o-, m-, and p-nitrobenzaldehyde; o-, m-, and p-methoxybenzaldehyde; o- and p-chlorobenzaldehyde; m-, and p-tolualdehyde; also the mono and bis ethylene acetals of isophthalaldehyde, and the monoethylene acetal of terephthalaldehyde; the ethylene acetals of m- and p-carboxy benzaldehydes, and the 2-hydroxyethyl esters of these acetals.

Preferred starting materials are terephthalaldehyde bis(ethylene acetal), and 2-hydroxyethyl ester of p-carboxybenzaldehyde ethylene acetal and p-carboxybenzaldehyde ethylene acetal, the first of these three being especially preferred. Preparation of terephthalaldehyde bis(ethylene acetal) and other acetals was described by Rieche et al. (Chem. Ber. 91, 1935 (1958)). An improved synthesis, described below, may be employed to prepare terephthalaldehyde bis(ethylene acetal) that is suitable for use in the process of this invention. Parts are by weight.

Twenty-five parts of "practical" grade terephthalaldehyde (Eastman Organic Chemical #P3255, M.P. 112–116° C.) are dissolved in 45 parts of ethylene glycol. The resultant solution is heated to 90° C. with stirring, after which the pressure over the stirred hot solution is reduced gradually to about 8 mm. of mercury and held there while unreacted excess glycol and water of reaction distill out of the mixture. The reaction mixture is cooled and 42.5 parts of terephthalaldehyde bis(ethylene acetal) having a purity of 98% (suitable for oxidation) is recovered.

The medium for conducting the oxidation process of the invention is a nonacidic solvent for the acetal and the catalyst, which solvent is resistant to attack by oxygen under the process conditions employed. Examples of suitable solvents are aromatic hydrocarbons, such as benzene and naphthalene; alicyclic hydrocarbons, such as cyclohexane and cyclododecane; alkyl acetates, such as ethyl acetate and butyl acetate; nitriles such as acetonitrile; polyhydric alcohols such as ethylene glycol and glycerol and mixtures thereof. Benzene and mixtures of benzene with ethylene glycol are preferred solvents.

An oxidation catalyst is included in the reaction mixture. Cobalt compounds are preferred, for example, cobalt acetate, cobalt carbonate, cobalt hydroxide, and mixtures thereof. Cobalt naphthenate is preferred. Manganese naphthenate can also be used. The amount of catalyst employed is sufficient to provide at least $1 \times 10^{-5}$ parts by weight of cobalt per part of acetal to be oxidized and preferably does not exceed $20 \times 10^{-3}$ parts cobalt on the same basis. Larger amounts of catalyst may be employed but excessive catalyst is not beneficial and is economically undesirable. The catalyst can be dissolved before or during the oxidation, e.g. if cobalt carbonate is employed it becomes soluble by reaction in situ.

Molecular oxygen in the form of air under pressure is the preferred oxidizing agent. Oxygen itself can be used, or mixtures of molecular oxygen with inert gases such as nitrogen, carbon dioxide and krypton.

The reaction temperature can be from about 20 to about 125° C., preferably from about 75° to 100° C. An oxidation temperature of 150° C. is undesirably high since it encourages formation of by-products. Pressure of the oxidation can vary from essentially atmospheric to more than 100 atmospheres. A pressure in the range of 100–500 p.s.i.g. is preferred if air is employed as the oxidizing agent. The operating pressure is adjusted, depending on the composition of the gas, the temperature employed, and other factors that are well recognized in such oxidations. The time employed depends upon the oxidation conditions, and can extend to about 100 hours if very mild conditions are employed. Usually the oxidation time, temperature and pressure employed are balanced to give most efficient use of the processing equipment. If operating conditions are such that conversion of starting material is incomplete, unreacted starting material and partial oxidation products may be recycled. Strong acids, e.g. hydrochloric, which can cause cleavage of the acetals should be avoided.

The practice of the process of this invention is illustrated in the following examples, wherein all parts and percentages are by weight unless otherwise indicated.

EXAMPLE 1

This example illustrates one-step operation of the process of the invention. Into a stainless steel autoclave, fitted with an agitator, are charged 10 parts of terephthalaldehyde bis(ethylene acetal) hereinafter identified as "I" dissolved in about 53 parts of benzene containing $15 \times 10^{-4}$ parts of cobalt as naphthenate. The autoclave is closed, pressured to 500 p.s.i.g. by air, and heated to 90° C. for two hours, with continuous stirring of the liquid contents. The autoclave is then cooled to room temperature, residual pressure is vented slowly, and the reaction product analyzed by gas chromatography. The analysis shows 0.6 part of unreacted acetal, 3.8 parts of the partial oxidation product, i.e., the ethylene acetal of the 2-hydroxyethyl ester of p-formyl benzoid acid hereinafter identified as "II" and having the formula

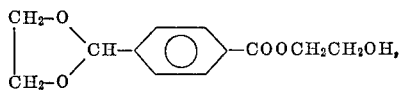

and 5.8 parts of the fully oxidized product, bis(2-hydroxyethyl)terephthalate hereinafter identified as "III." The yields of II and III, respectively, are 38% and 54% of the theoretical yield, based on the amount of starting material that is consumed, making a total yield of 92%. Product II above can be further oxidized to III.

EXAMPLES 2–15

The procedure of Example 1 is repeated with variations in the amount of catalyst, the pressure of air employed, and the time and temperature of the oxidation reaction, as indicated in the table below, the conversions of starting material I to products II and III also are shown in the table.

TABLE

| Ex. | Catalyst ratio[1] | Temperature, °C. | Air pressure, p.s.i.g. | Time, hours | Percent I consumed | Percent conversion of— | |
|---|---|---|---|---|---|---|---|
| | | | | | | I→II | I→III |
| 2 | 15 | 50 | 500 | 2.0 | 18 | 2.8 | 1 |
| 3 | 60 | 50 | 500 | 2.0 | 65 | 50 | 10 |
| 4 | 300 | 50 | 500 | 3.0 | 70 | 55 | 18 |
| 5 | 12 | 85 | 500 | 2.0 | 88 | 40 | 28 |
| 6 | 18 | 85 | 500 | 2.0 | 96 | 28 | 46 |
| 7 | 300 | 60 | 500 | 2.0 | 90 | 43 | 34 |
| 8 | 18 | 75 | 500 | 2.0 | 79 | 38 | 18 |
| 9 | 18 | 150 | 500 | 2.0 | 97 | 7 | 32 |
| 10 | 3 | 85 | 250 | 2.0 | 68 | 30 | 7 |
| 11 | 18 | 85 | 250 | 2.0 | 89 | 38 | 36 |
| 12 | 6 | 85 | 1,000 | 2.0 | 76 | 38 | 16 |
| 13 | 12 | 85 | 1,000 | 2.0 | 92 | 35 | 37 |
| 14 | 15 | 90 | 500 | 2.0 | 97 | 29 | 51 |
| 15 | 15 | 90 | 1,200 | 2.0 | 99 | 24 | 53 |

[1] $\dfrac{\text{Cobalt (parts by weight)}}{\text{I (parts by weight)}} \times 10^5$.

EXAMPLE 16

The procedure of Example 1 is repeated except that the ratio of cobalt catalyst/I is $30 \times 10^{-5}$, the reaction temperature is 75° C., and oxygen at 100 p.s.i.g. is used instead of air. The conversion of I to II is 39% and of I to III is 20% of theoretical.

EXAMPLE 17

This example illustrates the oxidtaion of I at ambient room temperature (about 20° C.) using the oxygen in air at prevailing atmospheric pressure.

A solution containing 2.5 parts of I and $7.2 \times 10^{-4}$ parts of cobalt as naphthenate in 18 parts of benzene, in contact with air at normal atmospheric pressure, is agitated by shaking for 72 hours at ambient temperature. The conversion of I to II is 37% and of I to III is 7% of theoretical. These relatively low conversions emphasize the adavntage gained by using higher temperatures and pressures during the oxidation.

EXAMPLE 18

This example illustrates the use of other cobalt-containing catalysts in the process of the invention.

(A) Example 1 is repeated using cobaltous acetate tetrahydrate (Co$^{++}$/I ratio by weight=$2.4 \times 10^{-3}$) as catalyst in a reaction carried out at 85° C. The conversion of I to II is 37% and of I to III is 22% of theoretical, respectively.

(B) Example 1 is repeated using cobaltous carbonate (Co$^{++}$/I ratio by weight=$5.0 \times 10^{-3}$) as catalyst. No unreacted I remains, and analysis shows that the product represents a 16% conversion of I to II and a 61% conversion of I to III.

EXAMPLE 19

This example illustrates the use of a mixed solvent as the reaction medium. Example 18–B is repeated with the inclusion of 2.2 parts of ethylene glycol in the reaction mixture. The product contains 1 part of unreacted I, 5.6 parts of II, and 3.5 parts of III, representing 52% conversion of I to II, and 31% conversion of I to III.

EXAMPLES 20–23

These examples illustrate the use of solvents other than benzene in the process of the invention. The procedure is substantially that of Example 1 with the exception of the amount of cobalt catalyst (as naphthenate) and the solvent, as indicated in the following tabulation:

| Ex. | Catalyst ratio[1] | Solvent | Percent of I consumed | Percent conversion of— | |
|---|---|---|---|---|---|
| | | | | I→II | I→III |
| 20 | 15 | Benzene | 94 | 36 | 51 |
| 21 | 15 | Ethyl acetate | 100 | 6 | 53 |
| 22 | 60 | Acetonitrile | 92 | 48 | 23 |
| 23 | 60 | Cyclohexane | 100 | 7 | 38 |

[1] $\dfrac{\text{Ratio cobalt (parts by weight)}}{\text{I (parts by weight)}} \times 10^5$.

EXAMPLE 24

The procedure of Example 1 is repeated, using only 7.5 parts of acetal I and $12 \times 10^{-4}$ parts by weight of cobalt (as naphthenate) as catalyst. The cooled reaction product is filtered to separate crude product III. To the filtrate is added 6 parts of acetal I, 9 parts of benzene, and an additional $12 \times 10^{-4}$ parts of cobalt (as naphthenate), and the mixture is subjected to oxidation under the same conditions as before. The procedure is repeated, with 6, 10 and 10 parts of I being added for cycles 3, 4 and 5, together with $12 \times 10^{-4}$, $6 \times 10^{-4}$, and $6 \times 10^{-4}$ parts of cobalt (as naphthenate), respectively. The total of product III recovered is 31.3 parts (70% conversion), and the residue of intermediate product II is 4.6 parts (11% conversion) after the five cycles. Crude product III after recrystallization from benzene has a purity of 99+%, and is identified as III by gas chromatography and nuclear magnetic resonance procedures.

EXAMPLE 25

A shaking tube autoclave is charged with 2.5 parts of p-tolualdehyde ethylene acetal, 17.5 parts of benzene, and 0.2 part of cobaltous acetate tetrahydrate (i.e., $19.2 \times 10^{-3}$ parts Co/part of acetal), pressurized with air at 750 p.s.i.g., and heated at 150° C. and shaken for 5 hours. The autoclave then is cooled to room temperature, residual pressure is released, and the mixture is analyzed. It contains 0.3 part of unchanged starting material and 2.2 parts of 2-hydroxyethyl-p-toluate, representing 80 mol percent conversion and 90 mol percent yield. The product contains also 0.2 part of 1,2-ethylene-bis(p-toluate).

EXAMPLE 26

A shaking tube autoclave is charged with 2 parts of p-carboxybenzaldehyde ethylene acetal prepared in a manner analogous to that used for I, 17.5 parts of benzene, 0.1 part of cobaltous acetate tetrahydrate ($12 \times 10^{-3}$ parts Co/part of acetal), pressurized with air to 750 p.s.i.g. and heated to 75° C. with shaking, for 3 hours. The reaction product contains 1.2 parts of unreacted starting material and 0.8 part of mono(2-hydroxyethyl)terephthalate (37 mol percent conversion and 92 mol percent yield).

What is claimed is:

1. A process for the preparation of the 2-hydroxyethyl ester of carboxylic acids corresponding to the mono and dialdehydes selected from the class consisting of benzaldehyde; o-nitrobenzaldehyde; m-nitrobenzaldehyde; p-nitrobenzaldehyde; o-methoxybenzaldehyde; m-methoxybenzaldehyde; p-methoxybenzaldehyde; o-chlorobenzaldehyde; p-chlorobenzaldehyde; m-tolualdehyde; p-tolualdehyde; isophthalaldehyde; terephthalaldehyde; m-carboxybenzaldehyde; p-carboxybenzaldehyde; m-carboxybenzaldehyde-2-hydroxyethyl ester and p-carboxybenzaldehyde-2-hydroxyethyl ester which comprises dissolving the ethylene acetal of said aldehyde in an inert nonacidic organic solvent containing a catalytic amount of a cobalt salt dissolved therein, oxidizing the dissolved acetal with molecular oxygen at a temperature in the range of about 20° to about 125° C. and a pressure in the range from about 1 to about 100 atmospheres, and thereafter recovering said ester.

2. The process of claim 1 wherein the medium is selected from the group consisting of benzene, ethylene glycol, ethyl acetate, acetonitrile, cyclohexane, and mixtures thereof.

3. The process of claim 2 wherein the source of oxygen is selected from the group consisting of oxygen, air, and mixtures of oxygen with an inert gas.

4. The process of claim 3 wherein the catalyst is selected from the group consisting of cobalt naphthenate, cobalt acetate, cobalt carbonate, cobalt hydroxide, and mixtures thereof.

5. The process of claim 4 wherein the amount of catalyst is at least about $1 \times 10^{-5}$ parts of cobalt per part of acetal, by weight.

6. The process of claim 1 wherein the acetal is selected from the group consisting of terephthalaldehyde bis-(ethylene acetal), the 2-hydroxyethyl ester of p-carboxybenzaldehyde ethylene acetal, p-tolualdehyde ethylene acetal, and p-carboxybenzaldehyde ethylene acetal.

7. The process of claim 5 wherein the acetal is terephthalaldehyde bis(ethylene acetal).

References Cited
UNITED STATES PATENTS 3,240,798   3/1966   Heywood et al. _____ 260—476 R LORRAINE A. WEINBERGER, Primary Examiner E. J. SKELLY, Assistant Examiner U.S. Cl. X.R.

260—471 R, 473 R, 476 R